US010779553B2

(12) United States Patent
Pack et al.

(10) Patent No.: US 10,779,553 B2
(45) Date of Patent: Sep. 22, 2020

(54) STAMP PLATE WITH MOULDING STOP

(71) Applicant: BÜHLER AG, Uzwil (CH)

(72) Inventors: Tanja Pack, Reichshof-Allinghausen (DE); Michael Paul, Bergneustadt (DE); David Marcinkowski, Waldbröl (DE); Frank Huperz, Bergneustadt (DE)

(73) Assignee: BÜHLER AG, Uzwil (CH)

( * ) Notice: Subject to any disclaimer, the term of this patent is extended or adjusted under 35 U.S.C. 154(b) by 178 days.

(21) Appl. No.: 15/301,506

(22) PCT Filed: May 4, 2015

(86) PCT No.: PCT/EP2015/059708
§ 371 (c)(1),
(2) Date: Oct. 3, 2016

(87) PCT Pub. No.: WO2015/169741
PCT Pub. Date: Nov. 12, 2015

(65) Prior Publication Data
US 2017/0112163 A1 Apr. 27, 2017

(30) Foreign Application Priority Data
May 6, 2014 (EP) .................................. 14167241

(51) Int. Cl.
A23G 1/20 (2006.01)
A23G 1/21 (2006.01)
(Continued)

(52) U.S. Cl.
CPC ........... A23G 1/205 (2013.01); A23G 1/0076 (2013.01); A23G 1/21 (2013.01); A23G 3/0263 (2013.01)

(58) Field of Classification Search
CPC ...... A23G 1/0076; A23G 1/21; A23G 3/0263; A23G 1/205; A23G 9/288; A23G 9/083;
(Continued)

(56) References Cited

U.S. PATENT DOCUMENTS 1,617,564 A * 2/1927 Becker .................... A23G 1/205
426/390
1,980,740 A * 11/1934 Balton .................... A23G 9/506
99/383

(Continued)

FOREIGN PATENT DOCUMENTS

EP 0 925 720 A1 6/1999
EP 0 945 069 A2 9/1999
(Continued)

OTHER PUBLICATIONS

International Search Report Corresponding to PCT/EP2015/059708 dated Jul. 8, 2015.
(Continued)

Primary Examiner — Xiao S Zhao
Assistant Examiner — Emmanuel S Luk
(74) Attorney, Agent, or Firm — Davis & Bujold PLLC; Michael J. Bujold

(57) ABSTRACT

A stamp plate (1) and a device for producing shell-shaped goods for consumption made of a food mass, in particular a fat mass such as cocoa or a chocolate-type fat mass. The stamp plate comprises a substantially flat base body (2) and at least one stamp (3) which can be temperature controlled and is arranged on the base body (2). The at least one stamp (3), during the intended use, can be immersed into a cavity (7) of a mold (7) in which the food mass is located, and the cavity corresponding to the stamp (3). At least one additional raised element (4) is arranged on the base body (2) as a spacer (5) for the mold (7).

22 Claims, 4 Drawing Sheets

Figure 1:
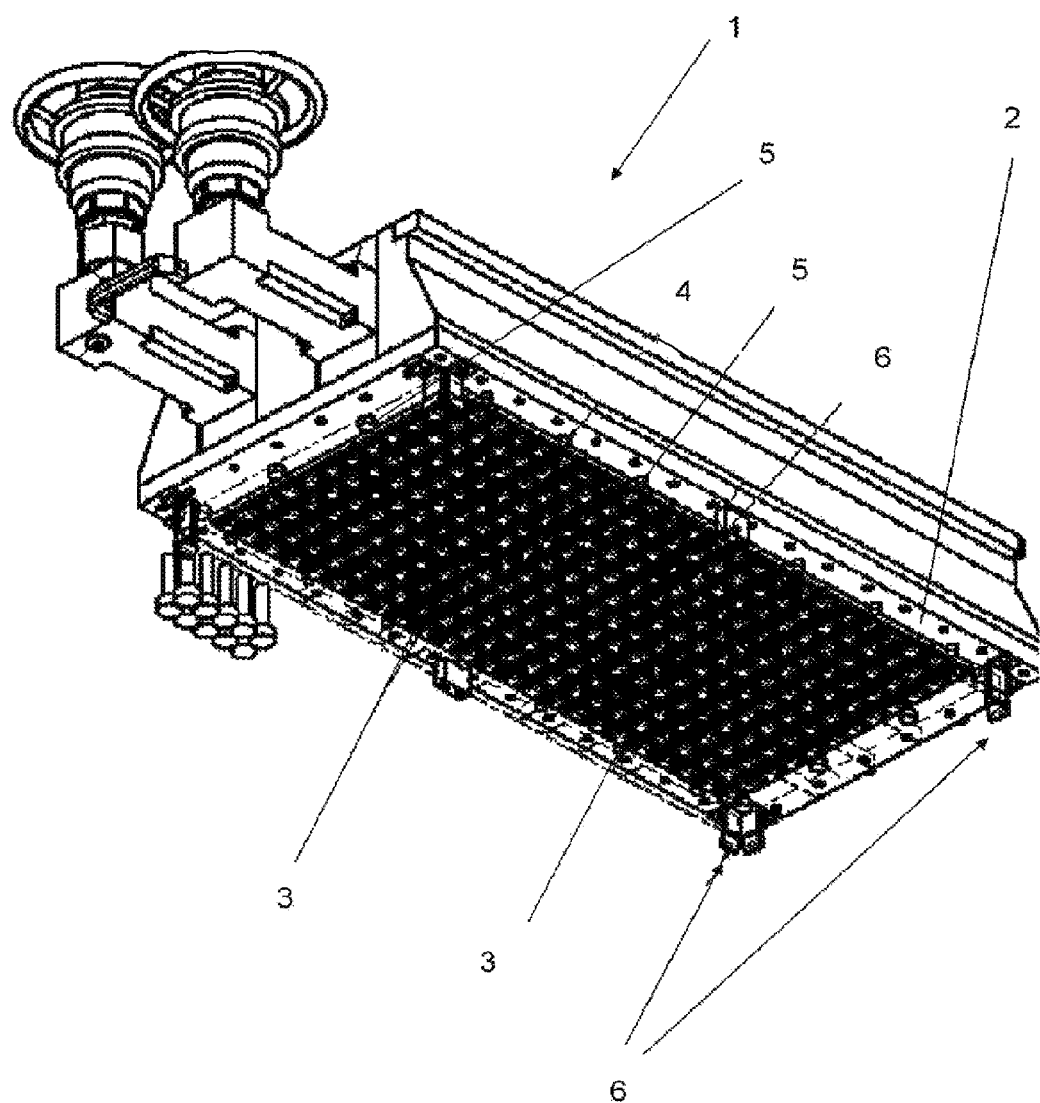

(51) Int. Cl.
*A23G 3/02* (2006.01)
*A23G 1/00* (2006.01)

(58) Field of Classification Search
CPC ........... B29C 39/42; B28B 7/26; B28B 3/028; B28B 2043/3665; B28B 2043/3615; B28B 7/24; B28B 3/02
See application file for complete search history.

(56) References Cited

U.S. PATENT DOCUMENTS

| | | | | |
|---|---|---|---|---|
| 2,111,498 A * | 3/1938 | Thomas | ................. | A23G 9/083 425/DIG. 219 |
| 2,176,408 A * | 10/1939 | Peterson | ................. | A23G 9/083 426/101 |
| 2,176,409 A * | 10/1939 | Peterson | ................. | A23G 9/04 426/279 |
| 2,204,495 A * | 6/1940 | Hogue | ................. | A23G 9/083 426/302 |
| 2,508,724 A * | 5/1950 | Moffett, Jr. | ................. | A23G 9/506 426/391 |
| 2,752,867 A * | 7/1956 | Niklason | ................. | A23G 9/083 425/189 |
| 3,021,695 A * | 2/1962 | Voigtmann | ................. | F25C 1/243 249/127 |
| 3,233,562 A * | 2/1966 | Nakamura | ................. | A23G 3/0252 249/141 |
| 3,518,091 A * | 6/1970 | Turner | ................. | A21B 5/02 426/19 |
| 4,038,016 A * | 7/1977 | Griner | ................. | A21B 5/026 425/451.9 |
| 4,489,876 A * | 12/1984 | Meyer | ................. | B29C 43/52 228/170 |
| 4,615,123 A * | 10/1986 | Brown | ................. | A23B 7/0053 34/577 |
| 4,812,323 A * | 3/1989 | Savage | ................. | A21D 13/33 249/122 |
| 4,931,301 A * | 6/1990 | Giuseppe | ................. | A21B 5/026 249/122 |
| 5,064,666 A * | 11/1991 | Vos | ................. | A23G 3/20 118/101 |
| 5,102,672 A * | 4/1992 | Vos | ................. | A23G 3/20 118/101 |
| 5,400,698 A * | 3/1995 | Savage | ................. | A21B 3/13 249/144 |
| 5,464,336 A * | 11/1995 | Planeta | ................. | B29C 48/913 425/72.1 |
| 5,709,827 A * | 1/1998 | Andersen | ................. | B01F 3/1214 264/102 |
| 5,733,399 A * | 3/1998 | Wood | ................. | B29D 29/08 156/138 |
| 5,783,126 A * | 7/1998 | Andersen | ................. | B29C 55/18 264/102 |
| 6,268,006 B1 | 7/2001 | Knobel | | |
| 6,508,642 B1 * | 1/2003 | Aasted | ................. | A23G 1/205 425/410 |
| 6,973,872 B2 * | 12/2005 | Morgan | ................. | A21B 3/13 99/428 |
| 7,008,655 B1 * | 3/2006 | Aslanis | ................. | A21B 5/026 426/100 |
| 7,845,929 B2 * | 12/2010 | Fiori | ................. | A23G 1/0076 425/342.1 |
| 7,980,847 B2 | 7/2011 | Steiner | | |
| 8,124,151 B2 * | 2/2012 | Knobel | ................. | A23G 1/0069 426/138 |
| 8,562,332 B2 | 10/2013 | Paul | | |
| 10,178,870 B2 * | 1/2019 | Gustav | ................. | A23G 1/0073 |
| 2004/0005386 A1 * | 1/2004 | Refer | ................. | A23G 1/0063 426/89 |
| 2005/0098926 A1 * | 5/2005 | Tamura | ................. | A21C 15/025 264/402 |
| 2005/0175737 A1 * | 8/2005 | Knobel | ................. | A23G 1/0069 426/89 |
| 2006/0257517 A1 * | 11/2006 | Steiner | ................. | A23G 1/205 425/412 |
| 2009/0017150 A1 * | 1/2009 | Paul | ................. | A23G 1/0076 425/352 |
| 2010/0062099 A1 * | 3/2010 | Funke | ................. | B29C 33/02 425/446 |
| 2012/0076885 A1 * | 3/2012 | Marquet | ................. | A22C 7/0053 425/346 |
| 2012/0244250 A1 * | 9/2012 | Bartolucci | ................. | A21B 5/02 426/18 |
| 2013/0285287 A1 * | 10/2013 | Ko | ................. | A63B 37/0003 264/319 |
| 2014/0220229 A1 * | 8/2014 | Gustav | ................. | A23G 1/0053 426/660 |
| 2014/0234523 A1 * | 8/2014 | Gustav | ................. | A23G 1/0073 426/631 |
| 2016/0061311 A1 * | 3/2016 | Hoiss | ................. | F16H 55/36 474/166 |
| 2017/0119007 A1 * | 5/2017 | Gustav | ................. | A23G 1/0076 |
| 2018/0220672 A1 * | 8/2018 | Knobel | ................. | A23G 1/0076 |

FOREIGN PATENT DOCUMENTS

| | | |
|---|---|---|
| EP | 2 018 811 A1 | 1/2009 |
| EP | 1 589 823 B1 | 7/2009 |
| EP | 1 863 355 B1 | 2/2010 |
| EP | 2 543 259 A1 | 1/2013 |
| WO | 97/49296 A1 | 12/1997 |
| WO | 98/52425 A1 | 11/1998 |
| WO | 03/094626 A1 | 11/2003 |
| WO | 2013/006599 A1 | 1/2013 |

OTHER PUBLICATIONS

Written Opinion Corresponding to PCT/EP2015/059708 dated Jul. 8, 2015.

* cited by examiner

STAMP PLATE WITH MOULDING STOP

The invention relates to a device for producing consumer products which are molded in a shell-like manner from a food mass, in particular a fatty mass, preferably a cocoa-containing or chocolate-like fatty mass. Chocolate shells which are produced in this manner are used, for example, for the production of pralines.

Such a device contains a large number of hollow molds or cells which are typically constructed as recesses in a mold, a mold block or a mold plate. These hollow molds or cells can be filled with one or more flowable, preferably temperature-controlled food masses, in particular a fatty mass. The cells can be completely or partially filled. The inner face of a respective cell determines in this instance the outer face of a shell-like consumer product which is intended to be produced.

The device further contains a large number of stamps which can be temperature-controlled and which can be movably supported on a retention device, wherein a stamp can be lowered in each case into one of the cells. The stamps may also be movable with the molds. Alternatively or additionally, the mold may be able to be moved vertically so that the mold with the cells can be lifted to the stamps. The outer face of a respective stamp determines in this instance the inner face of the shell-like consumer product which is intended to be produced. The stamps are generally arranged on a stamp plate.

Using this device, shell-like consumer products can be produced. They are generally further processed, for example, filled and/or covered or assembled to form a hollow member.

At the beginning of the method, molten fatty mass is metered into the hollow molds or cells of a mold, a mold block or a mold plate so that they are partially filled with the molten mass. Generally, the partially filled molds are briefly vibrated in order to remove any gas inclusions and/or to distribute the molten mass. The retention device is then lowered with the at least one stamp plate which is fitted thereto against the mold, the mold block or the mold plate, wherein the generally cooled stamps are introduced into the cells which are partially filled with the molten mass and displace the molten mass which is then distributed in the respective hollow space between the outer face of a cooling member and the inner face of a cell. The retention device with the stamps then remains for a short dwell time in this lowered position until the mass which is distributed in the respective cells has solidified. Subsequently, the stamp plate is raised again and the completely molded shell-like consumer products of solidified mass can be removed from the molds. Alternatively or additionally, the molds can be moved in the direction of the stamps. This method is also referred to as "cold stamping".

A plastics material plate is generally used as a mold, mold block or mold plate with hollow molds or cells.

The coolable stamps of the stamp plate generally comprise a metal which has the best possible level of thermal conductivity, such as, for example, aluminum or copper.

Excess food mass which is discharged from the cells is after molding removed from the surface of the mold, for example, using a scraper or using a vibrating roller so that the consumer products which are formed in a shell-like manner have a defined edge.

Over time, deformations and occurrences of wear may appear on the mold plates. Since they are relatively thin, the mold plates have a tendency to bend and curve so that they are no longer completely flat if they are placed on a mold table or a conveying device.

In order to define the respective hollow spaces between a stamp outer face and a hollow mold inner face in the most uniform manner possible over the entire mold, the stamp plate has to be pressed from above against the mold during each cold stamping operation.

Excess food mass may in this instance be discharged from the hollow molds in an uncontrolled manner, in particular when the mold plate already has deformations and occurrences of wear. The excess mass can then form drops which can be removed only with some complexity or which are introduced into the consumer products which have been molded in a shell-like manner.

In order to ensure a constant spacing between the stamp plate and the mold plate, it has been proposed, for example, in EP 0 945 069 A1 or in EP 0 925 720 A1, to independently suspend all the stamps on the retention device. Although this enables an improvement of the sealing of each individual hollow mold, a large number of individual components on the retention device and consequently a significant expense have to be accepted instead.

EP 1 863 355 discloses the arrangement of stamps in stamp groups which are supported independently of each other. This procedure also requires significant complexity in terms of equipment for supporting the stamp groups.

WO 97/49296 and EP 1 589 823 disclose stamps which are provided with a flexible sealing lip. The sealing lips are subjected to wear, have to be controlled, cleaned and where applicable replaced. In particular when the mold plate is no longer completely level, excess food mass can also be discharged in an uncontrolled manner through a sealing lip.

It has been found that excess food mass can be discharged in a controlled manner when the stamp does not completely seal the hollow mold but instead a gap having a specific gap width remains between the edge of the stamp and the edge of the hollow molds during the molding operation.

Excess food mass can be discharged in a uniform manner from the hollow molds through this gap. It forms on the mold plate a film which can be readily removed by a vibrating roller.

So that the excess food mass forms a film for each cell over the entire mold plate, the gap width has to remain substantially the same over the entire mold which is difficult, in particular when the mold already has deformations and occurrences of wear.

An object of the invention is to provide a device and a method of the type mentioned in the introduction which avoid the disadvantages of known devices and methods and which enable a defined discharge of excess food mass in the case of all stamp/cell pairs even after a long operating time of the device.

The object is achieved with a stamp plate for a device for producing consumer products which are molded in a shell-like manner from a food mass, in particular a fatty mass, preferably a cocoa-containing or chocolate-like fatty mass. During the production, it is also possible to use a plurality of different food masses, for example, for a multi-layer shell-like product or a multi-colored product.

The stamp plate comprises a substantially planar base member. On the base member there is arranged at least one stamp which can be temperature-controlled and which, when used in accordance with provisions, can be introduced into a cell which corresponds to the stamp. The cell is arranged in a mold and the food mass is located in the cell. The stamp and cell may be substantially complementary in terms of shape. The stamp forms the inner surface of the shell-like consumer product, the cell the outer surface. The stamp and cell are shaped in such a manner that, when used in accordance with provisions, there is formed between the stamp and cell a molding space in which the food mass which can be molded or which has been molded finds space.

According to the invention, there is arranged on the base member at least one additional raised element as a spacer with respect to the mold.

The spacer is positioned after the stamp plate has been lowered or after the mold has been raised on the surface of the mold and ensures that the surface of the base member away from which the stamp extends when the stamp is introduced into the cell cannot strike the surface of the mold even when the cell is not completely filled or food mass is displaced from the cell. This may happen when the mold is, for example, no longer completely even.

The cell consequently cannot be closed by the stamp plate but instead a gap may be formed between the edge of the cell of the mold and the stamp which is introduced into the cell of the mold and excess food mass can be discharged therefrom in a controlled manner.

In particular in cells and/or stamps which have a complex structure, excess food mass is generally selectively used so that each location of the molding space is filled with food mass. In this instance, in particular the edge of the shell-like product is intended to be constructed to be continuous. It is therefore advantageous for the excess mass not to be discharged at individual locations of the edge, but instead over the entire edge. This is enabled by means of the formation of the gap. It is further desirable for the gap to be formed in all cell/stamp pairs and for the gap width for all pairs to be substantially the same. The spacer ensures a defined construction of the gap.

In a preferred embodiment of the invention, the spacer is raised from the base member less than the location of the stamp furthest away from the base member.

The stamp advantageously comprises a base element and a molding element which is introduced into the cell. Preferably, the spacer has a maximum height over the base member which is greater than the maximum height of the base element so that the base element cannot reach the surface of the mold.

In an advantageous embodiment of the stamp plate according to the invention, a plurality of spacers and a plurality of stamps are arranged on the base member, wherein the spacers are arranged in particular in the edge region of the base member and preferably in a state distributed around the stamps. Preferably, the spacers are distributed in a uniform manner on the stamp plate so that using the spacers a uniformly distributed pressure can be applied to the mold.

Consequently, the mold can be pressed down in a uniform manner over the entire face and can be brought into a planar orientation where applicable in this instance. The construction of a gap between the cell and stamp for the discharge of excess food mass can be ensured over the entire mold and for all the cells.

Preferably, the at least one spacer is constructed from metal, in particular as a turned component. The spacer is then subjected to hardly any wear and is very suitable for transmitting a force from the stamp plate to the mold.

A turned component, as a result of the smooth surface thereof, has less tendency to become dirty and can at least be readily cleaned.

Advantageously, the at least one spacer can be disassembled from the base member. To this end, it has in particular a thread by means of which it can be releasably secured to a corresponding thread of the base member. The spacer may be changed should this become necessary, for example, in the event of a changed arrangement of cells in the mold, a changed shape of the cells, new filling masses or as a result of wear.

The spacer has in particular an outer thread whilst there is provided on the stamp plate an inner thread which is preferably recessed in the base member and which completely receives the outer thread in the assembled state.

The stamp plate preferably has more receiving members for spacers than spacers. The positions of the spacers can be adapted in an optimum manner to the mold which is used in each case.

The spacers can also be retrofitted on existing stamp plates if they are provided with corresponding receiving members, for example, with threads.

In a preferred embodiment, the at least one spacer has an engagement face for a tool. This may involve recesses for a screwdriver. Preferably, the spacer has a polygonal shape. The spacer can then, in spite of the engagement face for the tool, have a substantially even surface by means of which it can abut the surface of the mold.

In addition, the stamp plate may be constructed in such a manner that at least one guide for the mold is arranged on or at the base member. The guide ensures that when the stamp plate is lowered or when the mold is raised, corresponding pairs of stamps and cells strike each other with a specific desired level of precision.

The guide may cooperate with a corresponding guiding element on the mold and, for example, be constructed as a centering pin which strikes a centering opening. Preferably, the guide is constructed with two bars which are arranged at right angles and which can engage around a corner of the mold.

The object is further achieved by a device for producing consumer products which are molded in a shell-like manner from at least one food mass, in particular a fatty mass, preferably a cocoa-containing or chocolate-like fatty mass, having a stamp plate as described above. The device further has a receiving member for a mold having at least one cell for filling with flowable food mass and consequently forms a cold stamping device.

The receiving member may be a conveying device for molds, for example, a conveyor belt, a roller and/or a chain conveyor. With the conveying device, the molds are moved to the stamp plate and where applicable moved together with the stamp plate. The receiving member may also be a mold table on which the molds are positioned or are suspended.

Preferably, the device comprises at least during operation a mold having at least one cell for filling with flowable food mass, wherein the at least one spacer is arranged on the stamp plate in such a manner that, when the food mass is molded, it is positioned on the surface of the mold and does not strike a cell.

The at least one spacer is preferably constructed in such a manner that, when the stamp is introduced into the cell of the mold, a gap is ensured between the edge of the cell and the stamp which is introduced into the cell. Via this gap which is preferably continuous, excess food mass can be discharged and forms around the cell a carpet-like film which can be readily removed.

The width of the gap is preferably approximately from 0.1 to 1 mm, in a particularly preferred manner from 0.1 to 0.5 mm, more particularly preferably approximately from 0.18 to 0.22 mm.

Preferably, the mold is constructed from plastics material and has reinforcement webs, wherein the at least one spacer is arranged in such a manner that, when the food mass is molded, it is positioned on the mold in the region of a reinforcement web.

Plastics material molds are lightweight, can be readily guided using a conveying device through a casting installation, in particular through a cold stamping device, are easy to empty and clean. When they have corresponding webs as reinforcements, a force can be applied to them.

The plastics material molds have two main faces which form an upper side or lower side of the mold. The upper side is the side from which the cells are filled with food mass. The other side is the lower side. The webs are preferably arranged on the lower side. The surface of the plastics material mold facing the stamp plate may thus be constructed to be as smooth as possible so that excess food mass can be readily removed.

However, it is also conceivable for spacers or reinforcement elements to be arranged on the surface of the mold facing the stamp plate and for the gap for the discharge of excess mass to thus be ensured by means of a spacer on the mold.

It is further conceivable for the spacer to be constructed as a separate element which can be guided between the stamp plate and mold and which moves into abutment with the stamp plate and the mold only after the stamp plate has been lowered and/or the mold has been raised.

The object is further achieved by a method for producing consumer products which are molded in a shell-like manner from a food mass, in particular a fatty mass, preferably a cocoa-containing or chocolate-like fatty mass, in particular in a device as described above. The method comprises the step of lowering a stamp of a stamp plate into a corresponding cell of a mold and/or raising the mold in such a manner that a spacer which is arranged on the stamp plate is positioned on the mold. In this instance, the construction of a gap between the edge of the cell of the mold and the stamp which is introduced into the cell of the mold is ensured. The gap preferably has a width between 0.1 and 1 mm, preferably between 0.1 and 0.5 mm.

In an advantageous embodiment of the method, excess food mass when the stamp is introduced into the cell is discharged through the gap and a film of excess food mass is formed around the cell.

The film formation is promoted when the stamp has a base which ensures that the mass which is discharged is pressed flat. In addition, the neck of the molding element may be constructed in such a manner that the excess mass is directed in a uniform manner out of the cell.

The gap between the surface of the base member and the surface of the mold may also be so narrow that the mass which is discharged is forced into a flat shape.

The cell is preferably completely or partially filled with at least one temperature-controlled or non-temperature-controlled food mass before the stamp is lowered. Alternatively, the stamp may comprise a pouring channel through which mass is guided into the cell and the mass can be metered before, during or after the lowering of the stamp into the cells.

Subsequently, that is to say, after the food mass has been molded and the stamp has been lifted out of the cell and/or the mold has been lowered, the excess food mass can be removed from the mold, in particular with a vibrating roller. The molded food product is preferably subsequently further processed, for example, filled, covered, assembled to form a hollow member, coated and/or decorated. The object is further achieved with a method for retrofitting a stamp plate for a device for producing consumer products which are molded in a shell-like manner from a food mass, in particular a fatty mass, preferably a cocoa-containing or chocolate-like fatty mass. The device has a receiving member for a mold having at least one cell for filling with flowable food mass. At least one stamp which can be temperature-controlled is arranged on the stamp plate. On the stamp plate there is mounted according to the invention at least one spacer which ensures a gap between the edge of the cell of the mold and the stamp which is introduced into the cell of the mold.

Further details and embodiments of the present invention can be derived from the following examples and Figures.

Figure 2:
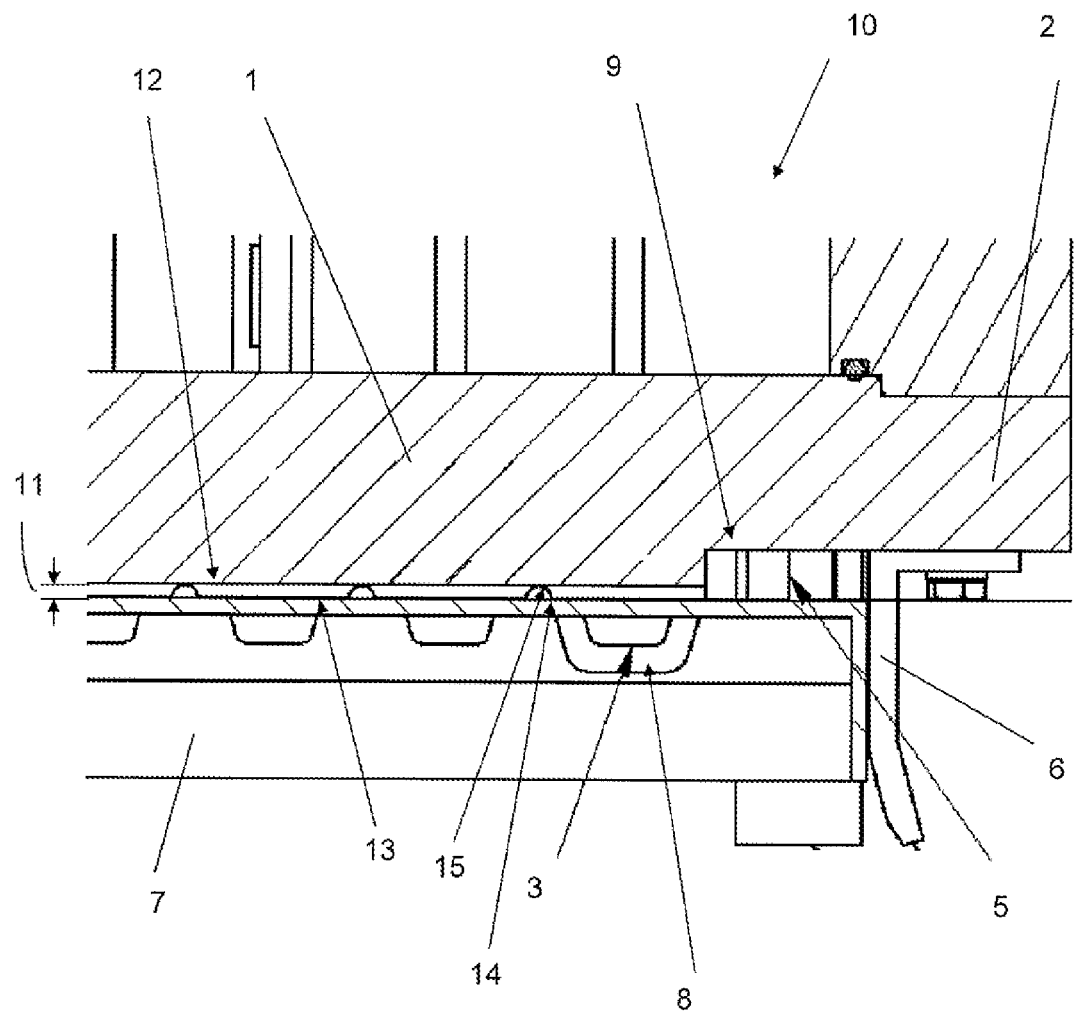
Figure 3:
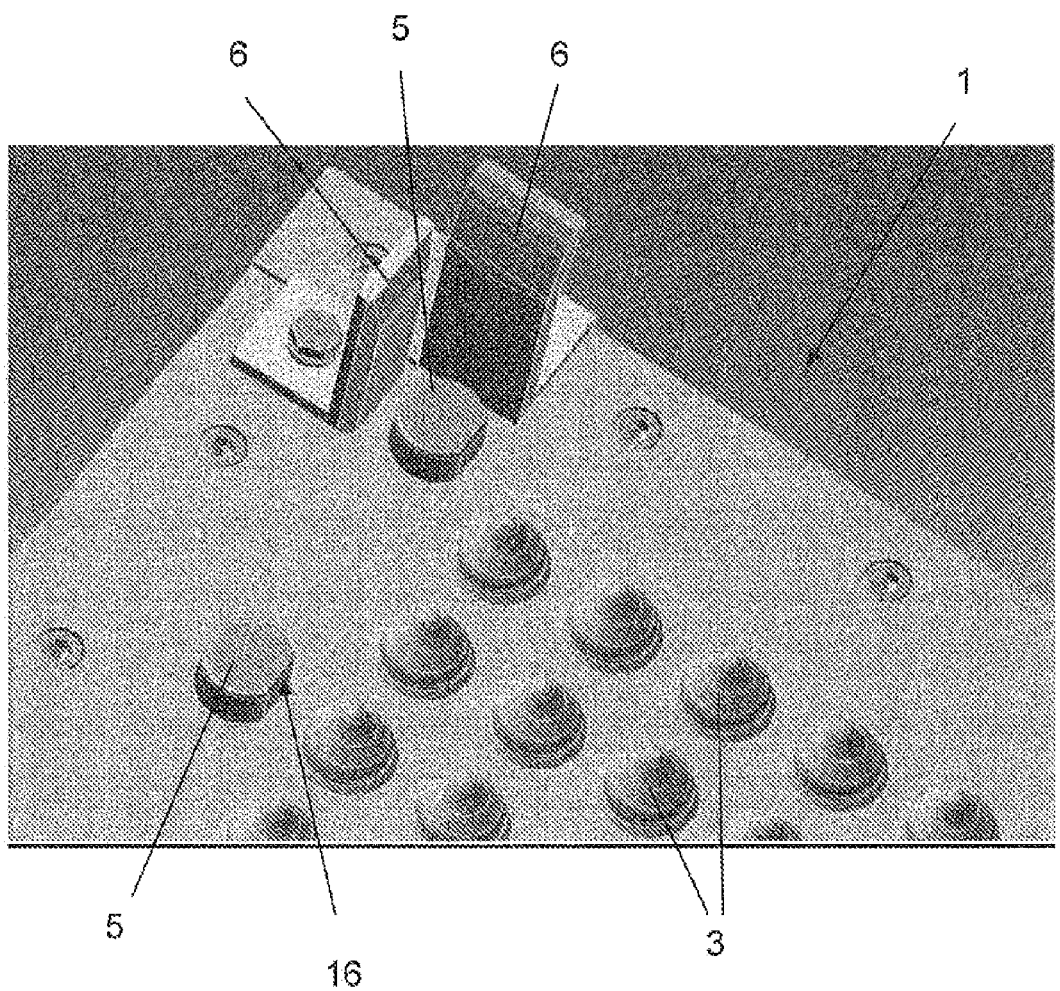
Figure 4:
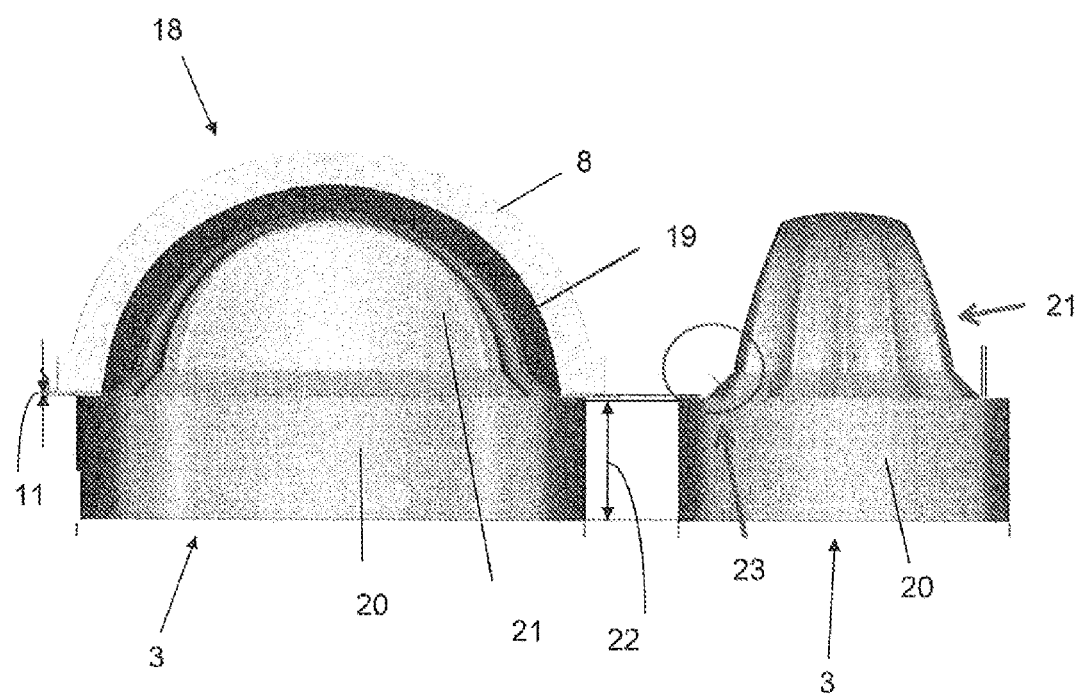

In the drawings:

FIG. 1: is a first perspective view of a stamp plate;

FIG. 2: is a schematic cross-section of an example of a device according to the invention;

FIG. 3: is a second perspective view of the stamp plate;

FIG. 4: is a lateral view of a cell/stamp pair and a stamp.

FIG. 1 shows a stamp plate 1 according to the invention. The stamp plate 1 comprises a substantially planar base member 2 and a large number of stamps 3 which are arranged on the base member 2 and which can be temperature-controlled.

These stamps are guided when used in accordance with provisions into a cell which corresponds to the stamp 3 and in which the food mass is located.

On the base member 2, additional raised elements 4 are arranged as spacers 5 with respect to the mold.

Guiding elements 6 are further arranged on the base member.

FIG. 2 is a schematic cross-section of an example of a device 10 according to the invention. The device 10 comprises a stamp plate 1 and a mold 7, in which there are formed cells 8 which are filled with food mass.

Stamps 3 are arranged on the base member 2 of the stamp plate 1. Furthermore, in the edge region 9 of the base member 2 there are provided spacers 5 which ensure a gap 11 between the surface 12 of the base member 2 and the surface 13 of the mold 7.

The gap width is approximately 0.2 mm.

The gap 11 results in excess food mass being able to be discharged between the edge 14 of the cell 8 and the edge 15 of the stamp 3 which is introduced into the cell 8 and forming a film on the surface 13 of the mold.

In the example shown, the spacer 5 is lowered into the base member 2.

FIG. 3 is a second perspective view of the stamp plate 1. The spacers 5 have an engagement face 16 for a tool which is not illustrated.

FIG. 4 is a lateral view of a cell/stamp pair 18 and a stamp 3.

The stamp 3 is introduced into the cell 8 and encloses therewith a space 19 in which food mass is molded, wherein the stamp 3 defines the inner contour of the shell-like consumer product and the cell 8 defines the outer contour.

The stamp 3 has a base 20 and a molding element 21 which is introduced almost completely into the cell 8. The base 20 has a height 22 which is slightly smaller than that of a spacer element which is not illustrated so that a gap 11 can be formed for the discharge of excess food mass.

The molding element 21 has a cover slope 23 via which excess food mass is discharged in a uniform manner from the space 19 into the gap. At the same time, the shell-like consumer product is molded in such a manner that it is readily possible to apply a cover which has good contact with the product in the region of the cover slope.

The invention claimed is:

1. A device for producing consumer products which are molded in a shell-like manner from a food mass, the device having a stamp plate and a receiving member for a mold having a plurality of cells for filling with the food mass, the stamp plate comprising:
- a base member having a surface; and
- a plurality of stamps which are arranged on the base member, which each protrude from said surface and are each temperature-controlled and which, when used in accordance with provisions, can be introduced into a respective one of the plurality of cells of the mold to mold consumer products in the shell-like manner and in which the food mass is located,
- each stamp comprising an individual base element and an individual molding element for introducing into the cell, and each of the base elements having greater width dimension than a width dimension of the respective molding element, and further each of the base elements having a width dimension greater than a width dimension of the respective cell which receives the molding element;
- wherein at least one spacer is secured to the base member for forming a gap between each of the plurality of stamps, which are introduced into the respective cell, and an edge of the respective cell on a surface of the mold, and the at least one spacer has a maximum height over the base member which is greater than a maximum height of the plurality of base elements, so that each of the base elements is prevented from abutting against the surface of the mold and a respective gap is formed, between each of the base elements and the surface of the mold, and excess food mass can be discharge between the base element and the surface of the mold, wherein the at least one spacer is secured to the base member and the at least one spacer comprising an abutment surface facing toward the mold, which is flat, such that the at least one spacer is adapted to abut against the surface of the mold.

2. The device according to claim 1, wherein the at least one spacer comprises a plurality of spacers are arranged on the base member.

3. The device according to claim 2, wherein the plurality of spacers are arranged in an edge region of the base member.

4. The device according to claim 3, wherein the plurality of spacers are arranged in a distributed state around the stamps.

5. The device according to claim 2, wherein the stamps are in one piece.

6. The device according to claim 1, wherein the at least one spacer is constructed from metal.

7. The device according to claim 6, wherein the at least one spacer is constructed as a turned component.

8. The device according to claim 1 wherein the at least one spacer can be disassembled from the base member.

9. The device according to claim 8, wherein the at least one spacer has a thread by which the at least one spacer is releasably secured to a corresponding thread of the base member.

10. The device according to claim 1, wherein the at least one spacer has an engagement face for a tool.

11. The device according to claim 1, wherein at least one guide for the mold is arranged on or at the base member.

12. The device according to claim 1, wherein the device comprises the mold having the plurality of cells to be filled with the food mass which is flowable.

13. The device according to claim 12, wherein the mold is constructed from plastics material and has reinforcement webs, and the at least one spacer is arranged in such a manner that, when the food mass is molded, the food mass is positioned on the mold in the region of a connection web.

14. The device according to claim 1, wherein the at least one spacer is constructed in such a manner that, when the stamp is introduced into the cell of the mold, the gap is ensured between the edge of the cell of the mold and the stamp which is introduced into the cell of the mold.

15. The device according to claim 14, wherein a width of the gap is approximately between 0.1 and 0.3 mm.

16. A method for producing consumer products which are molded in a shell like manner from at least one food mass using the device of claim 1, the method step comprising of lowering the stamps of the stamp plate into the corresponding cell of the mold.

17. The method according to claim 16, further comprising discharging excess food mass, when the stamp is introduced into the cell, through the gap and forming a film of excess food mass around the cell.

18. The method according to claim 17, further comprising removing the excess food mass from the mold, after the food mass has been molded and after the stamp has been lifted out of the cell.

19. The method according to claim 18, wherein the excess food mass is removed from the mold by a vibrating roller.

20. The method according to claim 16, wherein the mass is a cocoa-containing or chocolate-like fatty mass.

21. The method according to claim 16, wherein the gap has a width of between 0.1 and 0.3 mm.

22. A method for retrofitting a stamp plate to form the device of claim 1 the method comprising a step of mounting the at least one spacer on the stamp plate ensuring the gap between the edge of the cell of the mold and the stamp which is introduced into the cell of the mold, wherein the at least one spacer has the maximum height over the base member which is greater than the maximum height of the base element, so that the base element cannot reach the surface of the mold.

* * * * *